United States Patent
Kargilis et al.

(10) Patent No.: US 7,393,043 B2
(45) Date of Patent: Jul. 1, 2008

(54) METHOD AND SYSTEM FOR DETERMINING FULL OPEN POSITION OF A POWER LIFTGATE

(75) Inventors: John S Kargilis, Northville, MI (US); James L Carlson, Madison Heights, MI (US); Gene Compton, Clinton Township, MI (US)

(73) Assignee: Chrysler LLC, Auburn Hills, MI (US)

( * ) Notice: Subject to any disclaimer, the term of this patent is extended or adjusted under 35 U.S.C. 154(b) by 478 days.

(21) Appl. No.: 11/229,743

(22) Filed: Sep. 19, 2005

(65) Prior Publication Data

US 2007/0063535 A1  Mar. 22, 2007

(51) Int. Cl.
  *B60J 5/10* (2006.01)
(52) U.S. Cl. .................. 296/146.4; 296/146.8; 296/56; 49/26; 49/28
(58) Field of Classification Search .............. 296/50, 296/56, 146.4, 146.8; 49/26, 29, 31, 27, 49/28
  See application file for complete search history.

(56) References Cited

U.S. PATENT DOCUMENTS

| | | | |
|---|---|---|---|
| 6,297,605 B1 * | 10/2001 | Butler et al. ................ | 318/466 |
| 6,588,151 B1 | 7/2003 | Goscicki et al. | |
| 6,719,356 B2 * | 4/2004 | Cleland et al. ........... | 296/146.8 |
| 6,777,958 B2 * | 8/2004 | Haag et al. .................. | 324/674 |
| 7,219,945 B1 * | 5/2007 | Zinn et al. .................... | 296/56 |
| 7,320,497 B2 * | 1/2008 | Zinn et al. ............... | 296/146.4 |
| 2003/0115801 A1 * | 6/2003 | Goscicki et al. ................ | 49/26 |
| 2006/0131915 A1 * | 6/2006 | Ogino et al. .................. | 296/76 |
| 2007/0035156 A1 * | 2/2007 | Compton et al. ......... | 296/146.7 |

* cited by examiner

*Primary Examiner*—Jason S Morrow
(74) *Attorney, Agent, or Firm*—Ralph E. Smith

(57) ABSTRACT

A method and system for determining a full open position of a closure member of a motor vehicle that articulates between an open position and a closed position includes a left pinch sensor coupled to the left side of the closure member for sensing a pinch condition on the left side of the closure member and generating a corresponding pinch signal. A right pinch sensor is coupled to the right side of the closure member for sensing a pinch condition on the right side of the closure member and generating a corresponding pinch signal. Left and right gas springs are coupled respectively to the left and right sides of the closure member for assisting in articulating the closure member and each of the gas struts has an extension at an end thereof for compressing their corresponding pinch sensor when the closure member is at its full open position.

17 Claims, 4 Drawing Sheets

METHOD AND SYSTEM FOR DETERMINING FULL OPEN POSITION OF A POWER LIFTGATE

FIELD OF THE INVENTION

The present invention generally relates to power liftgates of motor vehicles. More particularly, the present invention pertains to a method and system for determining a full open position of a motor vehicle power liftgate.

BACKGROUND OF THE INVENTION

In motor vehicles such as minivans, sport utility vehicles and the like, it has become common practice to provide the vehicle body with a large rear opening. A liftgate (also referred to as a tailgate) is typically mounted to the vehicle body with hinges for pivotal movement about a transversely extending axis between an open position and a closed position. The liftgate is operated either manually or electronically via a power drive mechanism including a reversible electric motor. For example, such arrangements are shown in commonly assigned U.S. Pat. Nos. 5,531,498; 5,563,483; and 5,448,856.

There are instances, however, when it is desirable to disable the power drive mechanism associated with the liftgate. For example, during power operation of a vehicle liftgate, the liftgate may unexpectedly encounter an obstacle in its path. It is therefore desirable to cease its powered movement in that event to prevent damage to the obstacle and/or the liftgate and its power drive mechanism. U.S. Pat. No. 6,297,605 discloses a powered liftgate system having a pinch sensor for causing the liftgate movement to stop upon sensing an encounter with an obstacle.

An electronic liftgate system also requires a full open switch in order to maintain a controlled opening and closing in situations where the liftgate was left open and an associated controller was put to sleep due to vehicle energy conservation. When the liftgate is closed, the closed position is known even after the controller goes to sleep since a latch switch is activated. However, when the liftgate is left open and the controller is put to sleep, the position memory is lost and the controller only knows that it is not in a closed position. This is important because when the position is known, the controller can slow down the operation of the liftgate just before full open and close to prevent the system from opening or closing too fast. In current systems, when the position memory has been lost, the liftgate is controlled to go to the full open position via a full open switch, identified by reference numeral 11 in FIG. 3. The switch 11 is mechanically activated just before full open position and triggers the controller to start its slow down for a controlled full open position.

Although full open switches and pinch sensors are available separately to identify full open position and to disable movement of the liftgate under pinch conditions, respectively, these components are typically packaged separately within the vehicle with an expense associated with each component. It is, thus, desirable to use the pinch sensor for sensing obstructions and providing indication of a full open position in a cost effective manner.

SUMMARY OF THE INVENTION

Accordingly, it is a general object of the present invention to provide an improved sensing arrangement for a powered liftgate system for a motor vehicle.

It is an object of the present invention to provide a method and system for determining a full open position of a powered liftgate system while eliminating unnecessary circuitry.

In one form, the present invention provides a method for determining a full open position of a closure member of a motor vehicle wherein the closure member has a left side and a right side, is mounted for articulation relative to a body portion of the motor vehicle, and is driven by a drive mechanism between an open position and a closed position. The method includes determining whether a pinch condition is detected at both the left and right sides of the closure member and determining a time period between detecting a pinch condition at the left side and a pinch condition at the right side of the closure member. The method also includes determining the full open position of the closure member based on the time period.

In another form, the present invention provides a system for determining a full open position of a closure member of a motor vehicle wherein the closure member has a left side and a right side, is mounted for articulation relative to a body portion of the motor vehicle, and is driven by a drive mechanism between an open position and a closed position. The system includes a left pinch sensor coupled to the left side of the closure member for sensing a pinch condition on the left side of the closure member and generating a corresponding pinch signal. The system also includes a right pinch sensor coupled to the right side of the closure member for sensing a pinch condition on the right side of the closure member and generating a corresponding pinch signal. The system further includes a left and right gas spring coupled respectively to the left and right sides of the closure member for assisting in articulating the closure member, wherein each of the gas springs has an extension at an end thereof for compressing the corresponding pinch sensor when the closure member is at its full open position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
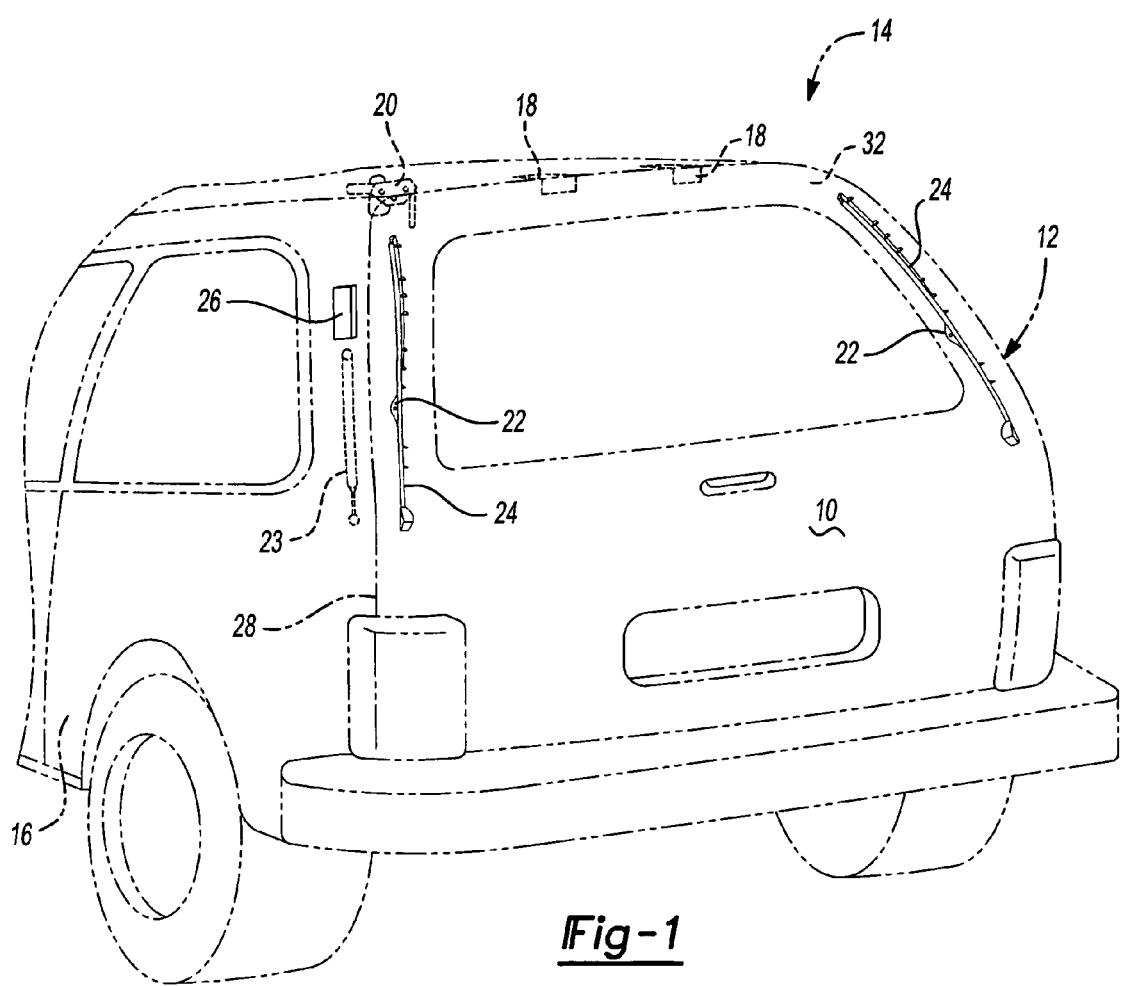
FIG. 1 is a rear perspective view of an exemplary motor vehicle incorporating a system for a power liftgate of a motor vehicle constructed in accordance with the teachings of a preferred embodiment of the present invention.
Figure 2:
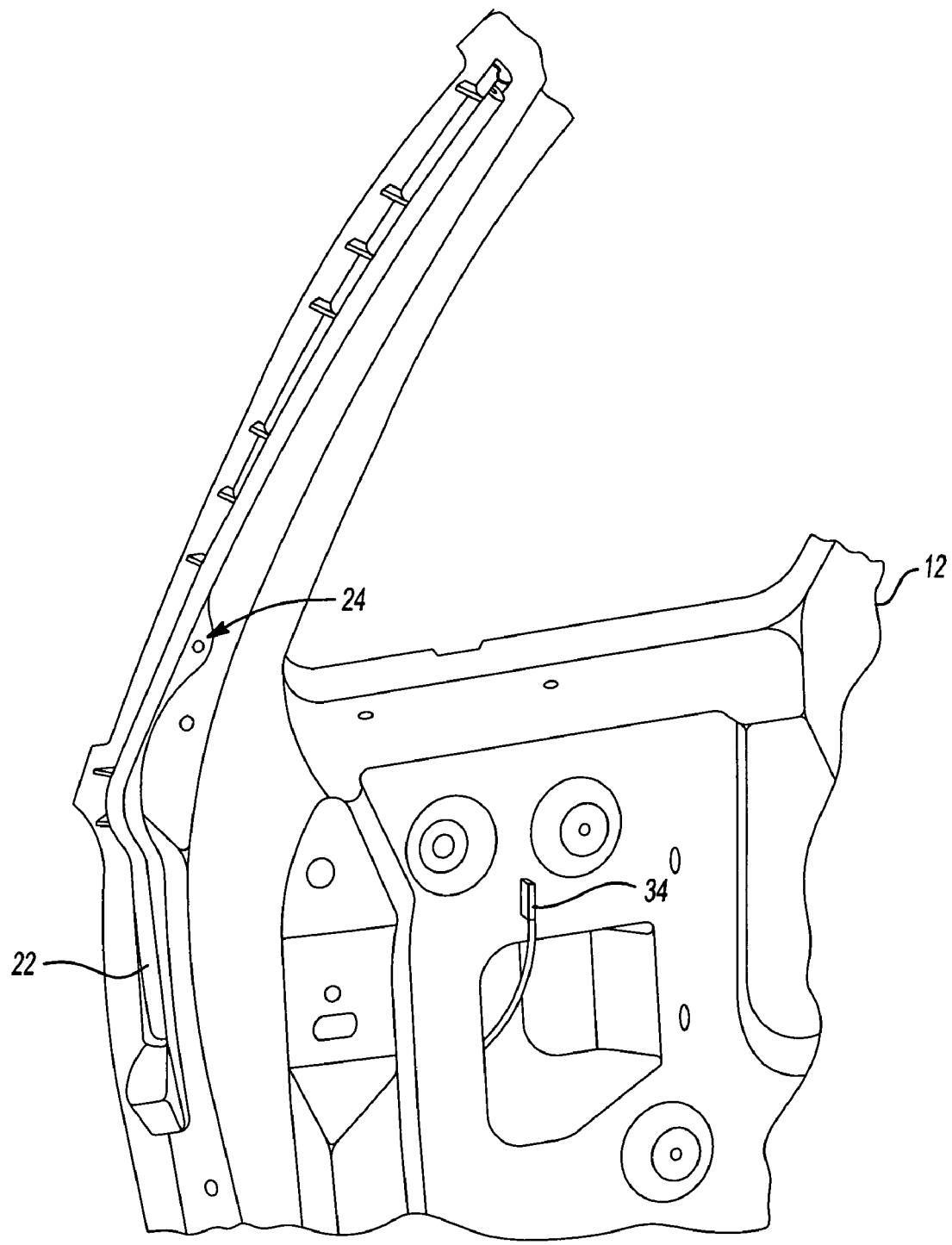
FIG. 2 is a view of a portion of an inner side of the liftgate of FIG. 1 with portions removed for further illustration of the system of the present invention.

With initial reference to FIGS. 1 and 2, a system for determining full open position of a liftgate constructed in accordance with the present invention is shown. The system 10 is shown operatively associated with a closure panel 12 of a motor vehicle 14. In the embodiment illustrated, the closure panel is a liftgate 12. It is to be understood by those skilled in the art that the particular use of the teachings of the present invention shown throughout the drawings is merely exemplary.

The liftgate 12 is mounted to a body 16 of the motor vehicle 14 through a pair of hinges 18 to pivot about a transversely extending pivot axis with respect to a large opening in the rear of the body 16. The liftgate 12 is mounted to articulate about its hinge axis between a closed position where it closes the opening and an open position where it completely uncovers the opening for free access to the vehicle body interior and assumes a slightly upwardly angled position above horizontal. The liftgate 12 is secured in its closed position by a latching mechanism (not shown). The liftgate 12 is opened and closed by a drive mechanism 20 with the assist of a pair of gas springs (one of which is identified at reference numeral 23) connected between the liftgate 12 and the body 16. Insofar as the present invention is concerned, the drive mechanism 20 is conventional.

In the exemplary embodiment illustrated, the system 10 includes left and right pinch sensors 22 positioned proximate to laterally opposing sides 28 and 30 of the liftgate 12. Both of the pinch sensors 22 include an upper end in close proximity to an upper lateral edge 32 of the liftgate 12. The pinch sensors 22 extend downwardly from their upper ends along a substantial portion of the liftgate 12. The pinch sensors 22 are both electrically attached to a wire harness 34 adapted to plug into a controller 26. In a conventional manner, the controller 26 controls the drive mechanism 20 to open the liftgate 12 in the event it receives an electrical signal from one of the pinch sensors 22.

In the exemplary embodiment illustrated, each of the pinch sensors 22 is mounted to the liftgate 12 through a mounting track 24. The mounting tracks 24 are substantial mirror images of one another. For this reason, only one of the mounting tracks 24 needs to be described herein. The mounting track 24 provides a mounting surface for the pinch sensors 22 which can deflect after either of the pinch sensors 22 compress and send the electrical signal to the controller 26. This deflection allows the controller 26 sufficient time to reverse the drive mechanism 20 without damaging the obstruction, the liftgate 12 or the drive mechanism 20. The mounting track 24 also provides a gradually changing surface to which the pinch sensors 22 can be mounted. In the exemplary embodiment, the pinch sensors 22 are mounted to the mounting tracks 24, which are in turn attached to the liftgate 12. Alternatively, it will be understood that in certain applications it may be desirable to mount the pinch sensors 22 and their associated tracks 24 to the body 16 of the motor vehicle 14 adjacent the closure member 12.

Figure 3:
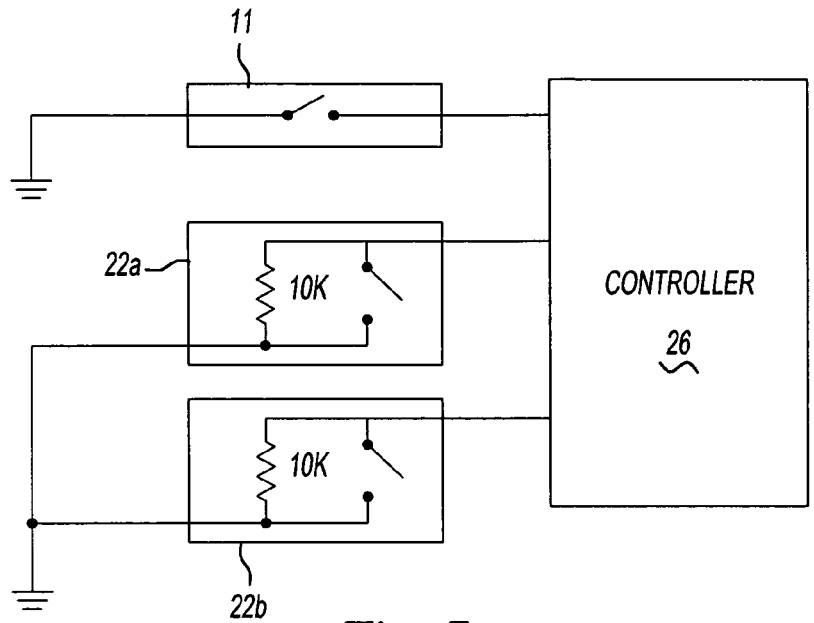
FIG. 3 is a schematic diagram of a prior art sensing arrangement for sensing both a pinch condition and the full open position condition of the powered liftgate.

As shown in FIG. 3, a motor vehicle 14 having a powered liftgate typically included a full open switch 11 as well as left and right pinch sensors, 22a, 22b. The pinch sensors 22 were used to identify a pinch condition, thereby signaling the controller 26 to reverse the drive mechanism 20 and open the liftgate 12. The full open switch 11 was used to signal the full open position of the liftgate 12 so the controller 26 could control the drive mechanism 20 accordingly. The present invention, however, eliminates the need for the separate full open switch 11 by using the existing pinch sensors 22 and the gas springs 23.

Figure 4:
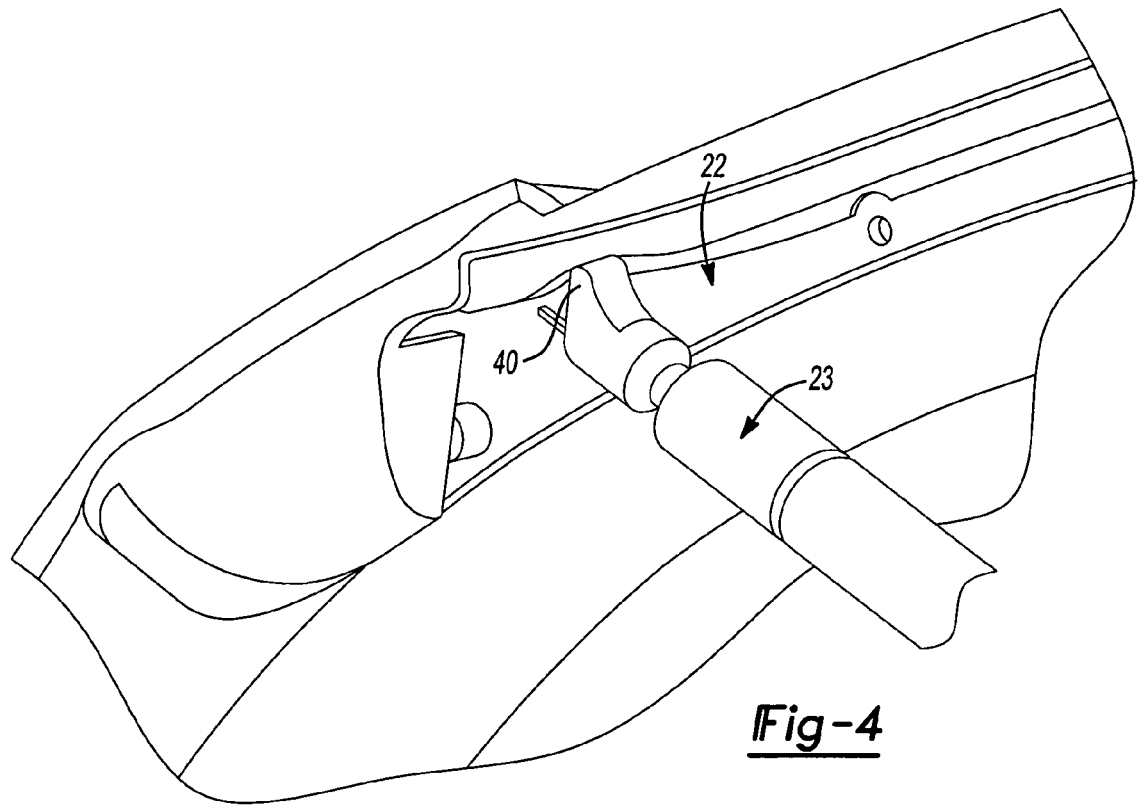
FIG. 4 is a view of a portion of an inner side of the liftgate of FIG. 1 to further illustrate the gas springs incorporating the extensions of the present invention.

The gas springs 23 of the present invention, however, have been modified slightly, one of which is shown in FIG. 4. The gas springs 23 each have an extension 40, such as a bump, molded or attached at an end closest to the pinch sensor 22 when the liftgate 12 is at its full open position. The extensions 40 compress their corresponding pinch sensors 22 when the closure member is at its full open position. If the extensions 40 compress the pinch sensors 22 at essentially the same time, the full open position of the liftgate 12 can be assumed. Otherwise, if only one extension 40 compresses their corresponding pinch sensor 22 or if both extensions 40 compress their pinch sensors 22 at different times, then the full open position is not assumed, but rather a pinch condition is detected.

Figure 5:
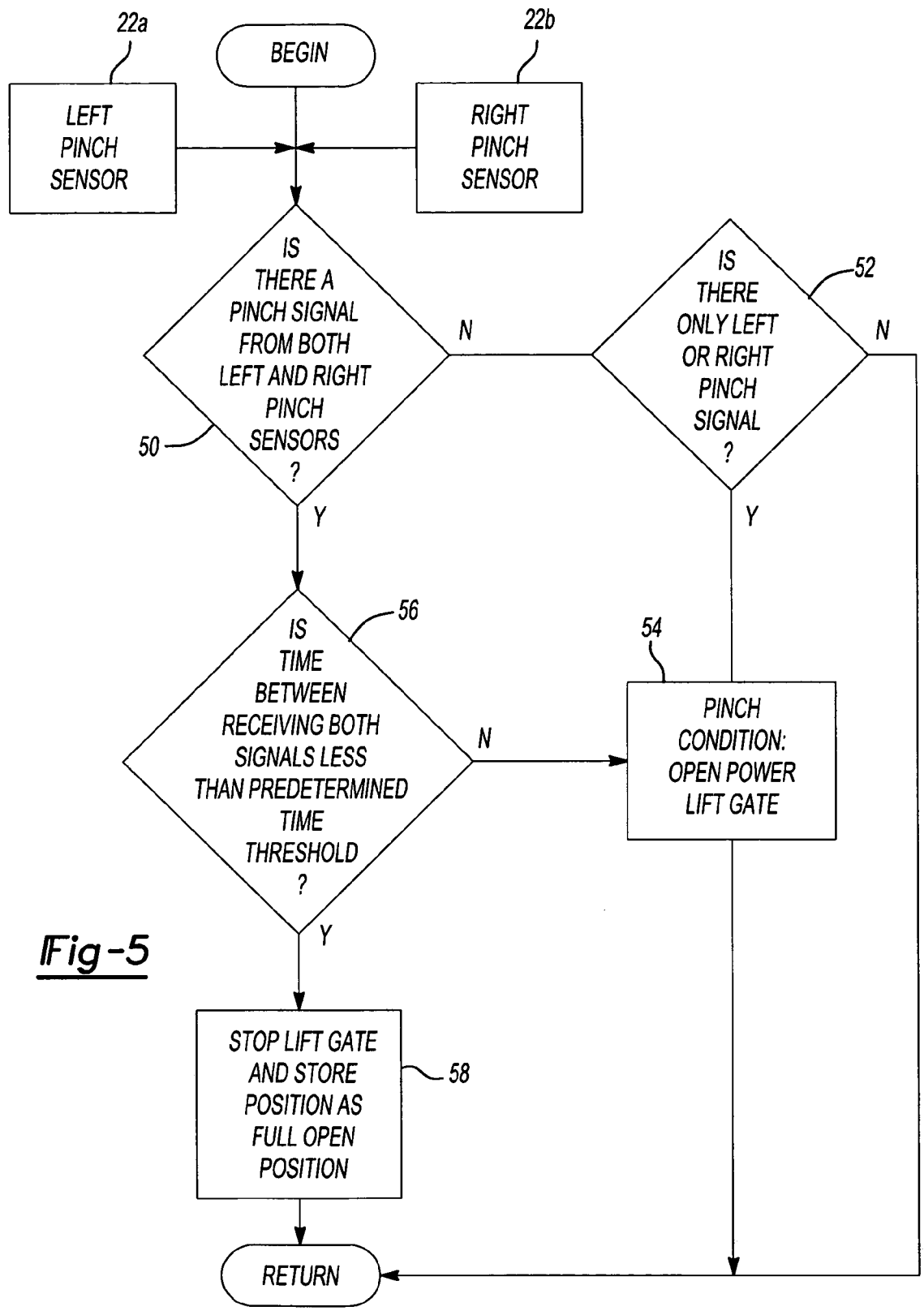
FIG. 5 is a flow diagram illustrating the method of the present invention.

Turning now to FIG. 5, a flow diagram is provided for illustrating the method of the present invention. The method begins with the step of determining if there is a pinch signal from both the left and right pinch sensors 22a, 22b, as shown at step 50. If not, the method proceeds to determine if there is only one pinch signal from either the left pinch sensor 22a or the right pinch sensor 22b, as shown at step 52. If no, the method returns to continuously monitor the pinch sensors 22a, 22b.

Returning to step 52, if there is only one pinch signal from either the left pinch sensor 22a or the right pinch sensor 22b, a pinch condition is detected, step 54, and the powered liftgate 12 is opened.

Returning to step 50, if there is a pinch signal from both the left and right pinch sensors 22a, 22b, the method proceeds to determine the time period between receiving both pinch signals. If the time period between receiving both left and right pinch signals exceeds the predetermined time threshold, then again a pinch condition is assumed at step 54 and the powered liftgate 12 is opened.

If, however, the time period is less than a predetermined time threshold, e.g., 0.5 seconds, then the full open position is identified and stored by the controller 26, as shown at step 58. This stored full open position can then be used in slowing down the liftgate 12 prior to the full open position to achieve a controlled full open position of the liftgate 12.

Thus, with a slight modification to the gas springs 23 already embodied in a powered liftgate system and additional software added to the controller 26, the full open position of the liftgate 12 can be determined without the added expense and reliability issues associated with a separate full open switch.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining a full open position of a closure member of a motor vehicle, the closure member having a left side and a right side, mounted for articulation relative to a body portion of the motor vehicle, and driven by a drive mechanism between an open position and a closed position, the method comprising:
   determining whether a pinch condition is detected at both the left and right sides of the closure member;
   determining a time period between detecting a pinch condition at the left side of the closure member and a pinch condition at the right side of the closure member; and
   determining the full open position based on the time period.

2. The method as recited in claim 1 wherein determining the full open position based on the time period comprises:

comparing the time period to a predetermined time threshold; and determining the full open position when the time period is less than the predetermined time threshold.

3. The method as recited in claim 2 wherein the predetermined time threshold is 0.5 seconds.

4. The method as recited in claim 2 further comprising:
driving the closure member to the open position if the time period exceeds the predetermined time threshold.

5. A system for determining a full open position of a closure member of a motor vehicle, the closure member having a left side and a right side, mounted for articulation relative to a body portion of the motor vehicle, and driven by a drive mechanism between an open position and a closed position, the system comprising:

a left pinch sensor coupled to the left side of the closure member for sensing a pinch condition on the left side of the closure member and generating a corresponding pinch signal;

a right pinch sensor coupled to the right side of the closure member for sensing a pinch condition on the right side of the closure member and generating a corresponding pinch signal; and a left and right gas spring coupled respectively to the left and right sides of the closure member for assisting in articulating the closure member, wherein each of the gas struts has an extension at an end thereof for compressing the corresponding pinch sensor when the closure member is at its full open position.

6. The system as recited in claim 5 wherein the extension is a bump integrally molded at the end of the gas spring that is closest to the pinch sensor when the closure member is at its full open position.

7. The system as recited in claim 5 wherein each of the extensions compress their respective pinch sensor within a predetermined time period when the closure member is at its full open position.

8. The system as recited in claim 7 wherein the predetermined time period is 0.5 seconds.

9. The system as recited in claim 7 further comprising:
a controller in electrical communication with the left and right pinch sensors and coupled to the closure member for storing the full open position.

10. The system as recited in claim 9 wherein the controller is further provided for driving the closure member to the open position when the predetermined time period is exceeded.

11. The system as recited in claim 1 wherein the closure member is a power liftgate.

12. A motor vehicle comprising:

a body;

a closure member mounted to the body for articulation about a laterally extending pivot axis between an open position and a closed position, the closure member having a left side and a right side;

a drive mechanism for driving said closure member between said open position and said closed position;

a left pinch sensor coupled to the left side of the closure member for sensing a pinch condition on the left side of the closure member and generating a corresponding pinch signal;

a right pinch sensor coupled to the right side of the closure member for sensing a pinch condition on the right side of the closure member and generating a corresponding pinch signal;

a left and right gas spring coupled respectively to the left and right sides of the closure member for assisting in articulating the closure member, wherein each of the gas springs has an extension at an end thereof for compressing the corresponding pinch sensor when the closure member is at its full open position; and a control module in electrical communication with said sensors, said control module for storing the full open position.

13. The motor vehicle of claim 12 wherein the extension is a bump integrally molded at the end of the gas spring that is closest to the pinch sensor when the closure member is at its full open position.

14. The motor vehicle of claim 12 wherein each of the extensions compress their respective pinch sensor within a predetermined time period when the closure member is at its full open position.

15. The motor vehicle of claim 12 wherein the predetermined time period is 0.5 seconds.

16. The motor vehicle of claim 14 wherein the controller is further provided for driving the closure member to the open position when the predetermined time period is exceeded.

17. The motor vehicle of claim 12 wherein the closure member is a power liftgate.

* * * * *